J. S. & T. B. ATTERBURY.
Lamp.
No. 102,204.
Patented April 26, 1870.
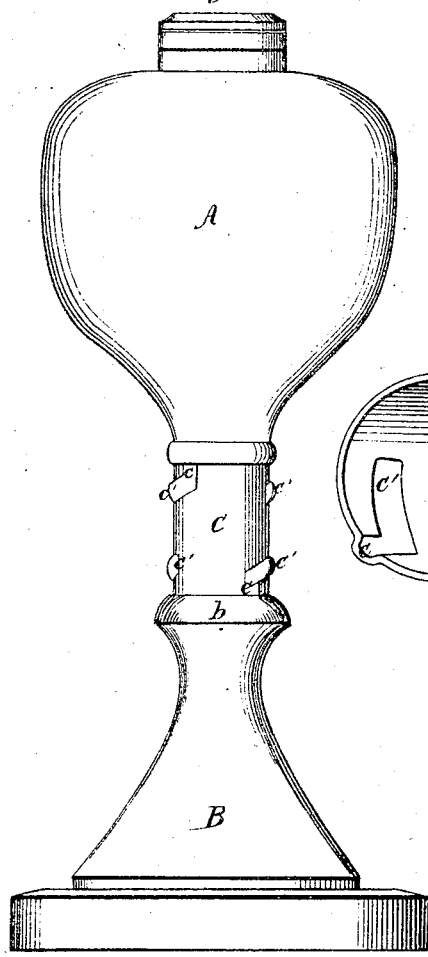
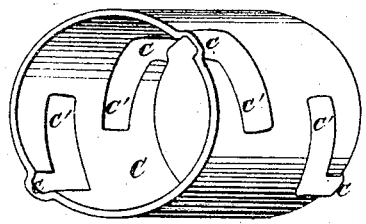
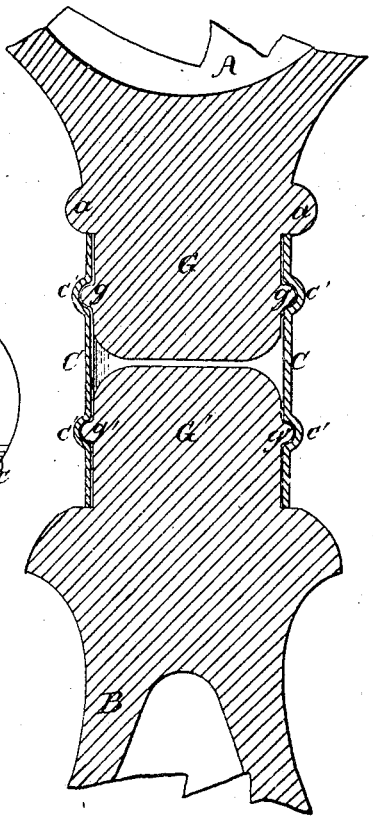
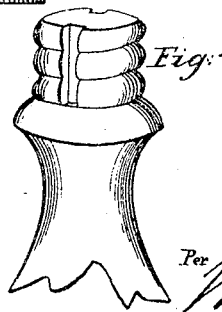
Witnesses;
R. T. Campbell
J. H. Campbell
Inventors,
Jas. S. Atterbury
Thos. B. Atterbury
Per Mason, Fenwick & Lawrence Attys

UNITED STATES PATENT OFFICE.

J. S. ATTERBURY AND T. B. ATTERBURY, OF PITTSBURG, PENNSYLVANIA.

Letters Patent No. 102,204, dated April 26, 1870.

IMPROVEMENT IN LAMPS.

The Schedule referred to in these Letters Patent and making part of the same.

*To all whom it may concern:*

Be it known that we, J. S. ATTERBURY and T. B ATTERBURY, of Pittsburg, in the county of Allegheny and State of Pennsylvania, have invented certain new and useful Improvements in Lamps; and we do hereby declare that the following is a full, clear, and exact description of our invention, reference being had to the accompanying drawings making a part of this specification, in which—

Figure 1 is an elevation of a portable stand-lamp, having our improvement applied to it.

Figure 2 is an enlarged sectional view, showing the manner of connecting together the lamp-reservoir and its pedestal or stand.

Figure 3 is a perspective view of the sleeve used to connect the lamp-reservoir to its stand.

Figure 4 shows the upper portion of a lamp-pedestal having parts of screw-threads formed on it.

Similar letters of reference indicate corresponding parts in the several figures.

The object of this invention is to improve lamps which are chiefly designed for burning the inflammable and explosive hydrocarbon fluids, and which have their fluid-reservoirs made of glass or other vitreous substances which possess the capability of being molded or blown in the required forms.

The invention consists—

Firstly, in forming either knobs, bosses, studs, or segments of spiral screw-threads upon the glass peg of a glass reservoir in the process of manufacturing such reservoir, adapted for receiving oblique grooves which are formed in a metallic socket on the upper end of the pedestal or stand upon which the said reservoir is mounted, and thereby making a rigid and more permanent connection of the reservoir to its stand than can possibly be effected by the use of cement, as will be hereinafter explained.

Secondly, in forming either knobs, bosses, studs, or segments of screw-threads upon the upper end of a lamp-pedestal which is made of glass or other vitreous substance, during the process of molding such pedestal, whereby a metal sleeve, having oblique threads formed upon it adapted to receive elevations upon the peg of a glass reservoir, can be secured rigidly to the said pedestal in a more permanent manner than can possibly be done by the use of cement, as will be hereinafter explained.

We are aware that Roland H. Smith made an application for Letters Patent, in the year A. D. 1865, for a mode of mounting a glass lamp-reservoir upon a pedestal or standard, which mode consisted in forming upon the glass peg of a glass lamp-reservoir a continuous screw-thread, adapted to screw into a socket formed in the upper end of a metallic or glass pedestal.

We are also aware that metallic lamp-reservoirs have been connected to their pedestals or stands by screw-fastenings cut on the metal connections.

Your petitioners obtained Letters Patent on the day of           , 1868, for an improved mode of connecting a glass lamp-reservoir to a glass pedestal by forming continuous screw-threads upon said parts, and using a metallic tube or socket-piece having corresponding screw-threads formed in it, as the means for connecting said parts together. We do not, therefore, claim, under this petition for Letters Patent, the continuous screw-thread fastenings above referred to.

To enable others skilled in the art to understand our invention, we will describe its construction and operation.

In the accompanying drawings—

A represents the glass fluid-reservoir of a pedestal or stand lamp; B, the glass pedestal thereof; and C, a metallic connecting-sleeve or socket-piece, which receives the peg G in its upper end, and a peg, G', which forms the upper end of the pedestal B.

The peg G on the lamp-reservoir A, and studs, bosses, or elevations $g$ $g$, together with a bead or shoulder $a$, are produced in the act of blowing or molding the reservoir, by having the mold constructed for the purpose.

The elevations $g$ $g$, on the circumference of the peg G, are arranged diametrically opposite each other, and are rounded, as shown in the drawing, fig. 2. We prefer to make the elevations in this manner, although they may be elongated and made somewhat like the segment of a screw-thread.

The upper end of the pedestal B is terminated by a cylindrical peg, G', a shoulder, $b$, and upon the circumference of this peg are elevations $g'$ $g'$, corresponding in form to the elevations $g$ $g$ upon the peg G of the reservoir A.

The pedestal B, with its shoulder $b$, peg G', and elevations $g'$, are produced of glass or other vitreous substance at one operation of blowing or molding.

The metallic tube C, which is used as the intermediate conecting portion of the lamp-bowl and its pedestal, may be made of sheet metal. It has produced in it, by swaging or otherwise, what might be termed concealed bayonet fastenings, which are adapted for receiving the studs or elevations on the pegs G G', and forming in conjunction therewith interlocking connections, which will firmly hold the two parts A B together.

Each one of these fastenings consists of a short groove, $c$, made in a direction with the length of the tube C, and terminating in an oblique groove, $c'$, thereby forming an obtuse groove.

The straight portions $c$ of the said grooves are arranged so that they will receive in them the elevations $g$ $g'$ on the two glass pegs G G' when these pegs are introduced into the ends of the tube C; then, by giving the parts a slight twist about their axes, the studs or elevations will be forcibly drawn into the oblique portions $c'$ of the grooves and firmly hold the parts together.

It will be seen, by reference to figs. 1 and 3, that the grooves $c$ $c$ on the upper end of the tube C are arranged in the reverse order to those on the lower end of this tube. This is done merely to allow the lamp-reservoir and the pedestal to be readily secured together, as above described, by holding one firmly in the hand while the other is turned to effect the fastening.

Having described our invention, and set forth one practical mode of carrying it into effect,

What we claim as new, and desire to secure by Letters Patent, is—

1. A glass lamp-reservoir, having one or more bosses or knobs $g$ formed on its glass peg G, substantially as and for the purposes described.

2. A glass lamp-stand or pedestal, B, having one or more bosses or knobs $g'$ formed on its peg G, substantially as and for the purposes described.

3. The parts A and B of a lamp, connected together by means of a metallic tube, C, having angular grooves $c$ $c'$ formed in it, and receiving knobs or bosses formed on the pegs G G' of said parts A B, substantially as and for the purposes described.

J. S. ATTERBURY.
T. B. ATTERBURY.

Witnesses:
A. PATTERSON,
JOHN C. STEVENSON.